| United States Patent [19] | [11] Patent Number: 4,464,526 |
|---|---|
| Mueller | [45] Date of Patent: Aug. 7, 1984 |

[54] PREPARATION OF POLYCAPROLACTONE

[75] Inventor: Herbert Mueller, Frankenthal, Fed. Rep. of Germany

[73] Assignee: BASF Aktiengesellschaft, Fed. Rep. of Germany

[21] Appl. No.: 499,355

[22] Filed: May 31, 1983

[30] Foreign Application Priority Data

Jun. 9, 1982 [DE] Fed. Rep. of Germany ....... 3221692

[51] Int. Cl.$^3$ ............................................. G08G 63/10
[52] U.S. Cl. .................................... 528/358; 528/355; 528/357; 560/185; 560/189
[58] Field of Search ....................... 528/355, 357, 358; 560/185, 189

[56] References Cited

U.S. PATENT DOCUMENTS 3,021,311 2/1962 Cox et al. ........................... 528/358

FOREIGN PATENT DOCUMENTS 1272572 5/1972 United Kingdom .

*Primary Examiner*—Earl A. Nielsen
*Attorney, Agent, or Firm*—Keil & Weinkauf

[57] ABSTRACT

Polycaprolactone is prepared by polymerization of ε-caprolactone by a process wherein a mixture of ε-caprolactone with a monohydric or polyhydric alcohol is passed, at from 50° to 160° C., over a fixed-bed catalyst comprising essentially anhydrous bleaching earth in the form of moldings.

5 Claims, No Drawings

PREPARATION OF POLYCAPROLACTONE

The present invention relates to a process for the preparation of polycaprolactone by polymerization of $\epsilon$-caprolactone using a monohydric or polyhydric alcohol as an initiator, in the presence of bleaching earth at from 50 to 160° C.

$\epsilon$-Caprolactone is polymerized by a compound possessing active hydrogen, i.e. an initiator, such as an alcohol or an amine, in the presence of a catalyst, such as an inorganic or organic acid, a Lewis acid or an organometallic compound, at from 20 to 200° C. However, the catalysts used tend to form byproducts and produce discolorations. Furthermore, they have to be separated off from the end product, and this entails a very technically complicated procedure. French Pat. No. 1,588,484 discloses that an acidic ion exchanger is used as a catalyst, which is separated off by filtration when polymerization is complete. However, the process has the disadvantage that the catalysts are not very active, and long polymerization times have to be accepted. Moreover, the service life of the catalyst is relatively short. In the process described in British Pat. No. 1,272,572, the catalyst used is a finely divided active clay, such as montmorillonite, which is a known bleaching earth. However, finely divided catalysts are also difficult to separate off, and their activity is unsatisfactory. Even with an amount of catalyst of 5%, a reaction time of 20 hours is required and the conversion achieved is only 82%. Furthermore, the catalysts very rapidly lose their activity when used repeatedly.

It is an object of the present invention to provide a process for the preparation of polycaprolactone in which only a small amount of byproducts is produced, the discoloration is reduced, and at the same time the catalyst used can be separated off readily and has high activity and a long service life.

We have found that this object is achieved by a process for the preparation of polycaprolactone by polymerization of $\epsilon$-caprolactone using a monohydric or polyhydric alcohol as an initiator, in the presence of a bleaching earth at from 50 to 160° C., wherein a mixture of caprolactone with a monohydric or polyhydric alcohol is passed over a fixed-bed catalyst comprising essentially anhydrous bleaching earth in the form of moldings.

The novel process has the advantages that polymerization can take place in a short time with high conversion, the catalyst used has a long service life and does not produce any byproducts, the resulting polymers have a good color number, which is advantageous for further processing, and finally, separation of the catalyst used from the polymer does not entail a complicated procedure.

Advantageously, the $\epsilon$-caprolactone employed has a water content of <0.5, in particular <0.1,% by weight.

The polymerization is carried out in the presence of a monohydric or polyhydric alcohol, advantageously a monohydric or polyhydric aliphatic alcohol, preferably a dihydric or polyhydric aliphatic alcohol. Examples of suitable alcohols are ethanol, propanol, butanol, ethylene glycol, propylene glycol, butanediol, polytetrahydrofuran, glycerol, trimethylolpropane and pentaerythritol, polytetrahydrofuran being particularly important industrially.

The polymerization of $\epsilon$-caprolactone is carried out in the presence of essentially anhydrous bleaching earth in the form of moldings. Particularly suitable bleaching earths are aluminum hydrosilicates or aluminum or magnesium hydrosilicates of the montmorillonite type which may have been activated by an acid. Bleaching earths are described in, for example, Ullmann's Encyklopadie der technischen Chemie, 3rd edition, Volume 4, pages 541–545. To prepare the moldings used according to the invention from an essentially anhydrous bleaching earth, the commercial water-containing, pulverulent bleaching earth is made into a paste with water, and the paste is kneaded, and converted to moldings, e.g. tablets, spheres or rings. Thereafter, the water-containing moldings are dried at above 100° C., preferably at from 150 to 700° C., under atmospheric or reduced pressure, in the presence or absence of a gas which is inert under the reaction conditions, e.g. a noble gas, such as helium or argon, but particularly nitrogen or air. The catalyst moldings used according to the invention advantageously have a water content of $\leq 1\%$ by weight, preferably from 0.01 to 0.5% by weight, in particular from 0.01 to 0.1% by weight. The molded bleaching earth may be present, for example, in the form of spheres, rings, cylinders or tablets. Spherical moldings have diameters of in general from 2 to 15 mm, preferably from 3 to 5 mm, while cylindrical moldings in general have a length of from 2 to 50 mm and a diameter of from 2 to 6 mm. Non-spherical and non-cylindrical moldings in general have a volume per unit weight which corresponds to that of the cylindrical moldings.

Using the novel process, polycaprolactone having any desired degree of polymerization can be prepared. The degree of polymerization is determined by the molar ratio of initiator alcohol to caprolactone. The smaller the ratio chosen, the higher the molecular weight obtained, and vice versa. Choosing the preferred reaction conditions, under which complete conversion is achieved, results in the degree of polymerization being determined unambiguously by the stoichiometry. Since polycaprolactones having a mean molecular weight from 300 to 10,000, in particular from 500 to 3,000, can be used in practice, the required initiator to caprolactone ratios can be determined via the stoichiometry.

According to the invention, a mixture of caprolactone with a monohydric or polyhydric alcohol is passed over a fixed-bed catalyst comprising essentially anhydrous bleaching earth in the form of moldings.

For the polymerization of $\epsilon$-caprolactone, only a small amount of the essentially anhydrous bleaching earth in the form of moldings is required, and this is advantageously placed in a reaction vessel, for example a tube furnace or a shaft furnace. The dimensions of the catalyst charge are preferably such that the heat of polymerization can be conducted away. Advantageously, long, cylindrical reaction vessels are used. The ratio of the internal diameter to the length of the reaction vessel is in general from 1:2 to 1:100, preferably from 1:10 to 1:40, and the reaction vessel may be vertical or horizontal. A vertical tube reactor with a tube diameter of from 10 to 100 mm is preferably used. Where precise temperature control during polymerization is not so important, it is also possible to use a simple shaft furnace as the reaction vessel. However, by circulating the reacted mixture and subjecting it to heat exchange between cycles, it is also possible to operate such a reactor isothermally. Product is removed from the product cycle at a rate corresponding to that at which fresh starting material is fed in.

To carry out the polymerization, a mixture of caprolactone with the initiator alcohol is passed over the essentially anhydrous bleaching earth moldings by a conventional method, for example by trickling or flooding. In the preferably employed flooding procedure, the mixture of caprolactone and initiator flows through the total volume of the catalyst, without forming a gas phase. Polymerization is carried out at from 50 to 160° C., advantageously from 60 to 120° C., under atmospheric pressure. The residence time at the catalyst is preferably from 5 to 8 hours, depending on the temperature employed. Prolonging the reaction time has no effect on the quality of the polycaprolactone obtained, while reducing the residence time at the catalyst results in incomplete conversion, and the end product obtained then has a lower molecular weight than that calculated from the ratio of starting materials ($\epsilon$-caprolactone and initiator alcohol). This procedure may be chosen if it is accepted that a part of the caprolactone will be recovered; this can be readily achieved by simple distillation.

The novel process is remarkable in that the essentially anhydrous bleaching earth catalyst moldings possess a higher activity than pulverulent bleaching earth which is used to prepare the moldings, and particularly so in that in general finely divided catalysts have a very much higher specific activity than catalyst moldings. The essentially anhydrous bleaching earth catalyst moldings retain their initial solid form for more than a year, produce no rubbings, and exhibit just as high an activity even after their polymerization time of one year. By using the bleaching earth catalyst moldings as a fixed bed, it is possible to avoid the technically complicated procedure of separating off the catalyst from the end product. The process for the polymerization of $\epsilon$-caprolactone is very much simplified as a result, and is reproducible with regard to the quality of the end product, in particular in respect of color and degree of polymerization.

The polycaprolactone obtainable by the process of the invention is useful, for example, for the preparation of polyurethanes.

In the Examples which follow, and illustrate the process according to the invention, parts are by weight. Parts by weight bear the same relation to parts by volume as that of the kilogram to the liter.

EXAMPLE 1

Commercial bleaching earth is made into a paste with water, the paste is molded to give extrudates having a diameter of 3 mm and an average length of from 10 to 20 mm, and the extrudates are dried for 4 hours at 220° C.

A tube reactor which has a volume of 1 part by volume and a ratio of diameter to length of about 5:70 and is provided with a thermostated cooling jacket is filled with the dry extrudates described above. A mixture of 1,500 parts of polytetrahydrofuran having a molecular weight of about 990 with 1,500 parts of $\epsilon$-caprolactone is passed downwards through the reactor, from above. The polymer is allowed to emerge through a siphon, so that the tube reactor remains completely filled with liquid. As soon as the product leaves the tubes reactor, it is once again pumped onto the top of the catalyst charge. The reaction temperature in the interior of the tube is 100° C. Fresh starting materials are fed in at a rate which corresponds to a residence time of about 10 hours over the catalyst charge. The reacted mixture then obtained contains only from 1 to 2% by weight of caprolactone, is free from catalyst residues and, after the monomeric caprolactone has been separated off by distillation, can be used directly, i.e. without further purification, for the preparation of, for example, polyurethane resins. The mean molecular weight of the polymer obtained from tetrahydrofuran and caprolactone is from 1,940 to 1,980.

EXAMPLE 2

Commercial 4 mm catalyst spheres comprising bentonite are dried in a stream of nitrogen at 180° C. for 8 hours and then introduced into the tube reactor described in Example 1. The reaction mixture described in Example 1, comprising polytetrahydrofuran and $\epsilon$-caprolactone, is then polymerized at 110° C., the residence time being 9 hours. The polycaprolactone obtained corresponds very closely to that of Example 1.

EXAMPLE 3

A reaction solution comprising 30 parts of butane-1,4-diol and 637 parts of $\epsilon$-caprolactone is polymerized for a residence time of 15 hours at 105° C. over a catalyst as described in Example 2, the procedure being carried out in the manner described in Example 1. The resulting polymer is freed under reduced pressure from small amounts of unreacted alcohol or $\epsilon$-caprolactone. The polycaprolactone obtained has a molecular weight of about 1940, calculated from the hydroxyl number. Conversion of the caprolactone is virtually complete.

A similar polymer is obtained if the starting mixture comprises 80 parts of neopentylglycol as the initiator alcohol and 547 parts of $\epsilon$-caprolactone as monomer. In this case, too, virtually 100% conversion is achieved.

We claim:
1. A process for the preparation of polycaprolactone by polymerization of $\epsilon$-caprolactone using a monohydric or polyhydric alcohol as an initiator, in the presence of a bleaching earth at from 50 to 160° C., wherein a mixture of caprolactone with a monohydric or polyhydric alcohol is passed over a fixed-bed catalyst comprising essentially anhydrous bleaching earth in the form of moldings.

2. A process as claimed in claim 1, wherein the bleaching earth moldings used are obtained by converting the bleaching earth to a paste with water, molding the resulting material, and drying the moldings at from 150 to 700° C.

3. A process as claimed in claim 1, wherein the bleaching earth moldings contain $\leq 1\%$ by weight of water.

4. A process as claimed in claim 1, wherein polytetrahydrofuran is used as the polyhydric alcohol.

5. A process as claimed in claim 1, wherein in polymerization is carried out by a flooding procedure, without a gas phase being formed.

* * * * *